(12) United States Patent
Giroux et al.

(10) Patent No.: US 9,459,876 B2
(45) Date of Patent: Oct. 4, 2016

(54) SYSTEM, METHOD, AND COMPUTER PROGRAM PRODUCT FOR MANAGING DIVERGENCES AND SYNCHRONIZATION POINTS DURING THREAD BLOCK EXECUTION BY USING A DOUBLE SIDED QUEUE FOR TOKEN STORAGE

(71) Applicant: NVIDIA Corporation, Santa Clara, CA (US)

(72) Inventors: Olivier Giroux, Santa Clara, CA (US); Gregory Frederick Diamos, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 571 days.

(21) Appl. No.: 13/945,842

(22) Filed: Jul. 18, 2013

(65) Prior Publication Data

US 2015/0026438 A1  Jan. 22, 2015

(51) Int. Cl.
*G06F 9/38* (2006.01)
*G06F 9/52* (2006.01)
*G06F 9/30* (2006.01)

(52) U.S. Cl.
CPC .............. *G06F 9/38* (2013.01); *G06F 9/3009* (2013.01); *G06F 9/30087* (2013.01); *G06F 9/3851* (2013.01); *G06F 9/524* (2013.01)

(58) Field of Classification Search
None
See application file for complete search history.

(56) References Cited

U.S. PATENT DOCUMENTS

| | | | |
|---|---|---|---|
| 7,353,369 B1 | 4/2008 | Coon et al. | |
| 7,617,384 B1 * | 11/2009 | Coon | G06F 9/3851 712/220 |
| 7,761,697 B1 * | 7/2010 | Coon | G06F 9/322 712/233 |
| 2005/0166206 A1 * | 7/2005 | Parson | G06F 9/526 718/104 |
| 2011/0078690 A1 * | 3/2011 | Fahs | G06F 9/46 718/102 |
| 2014/0156959 A1 * | 6/2014 | Heidelberger | G06F 5/065 711/163 |
| 2014/0365752 A1 * | 12/2014 | Howes | G06F 9/30003 712/233 |

OTHER PUBLICATIONS

Ahmad Lashgar, Amirali Baniasadi, Ahmad Khonsari. "Dynamic Warp Resizing in High-Performance SIMT" Computer Design (ICCD), 2012 IEEE 30th International Conference on, Sep. 30, 2012-Oct. 3, 2012.*
Steffen Frey, Guido Reina and Thomas Ertl. "SIMT Microscheduling: Reducing Thread Stalling in Divergent Iterative Algorithms" Parallel, Distributed and Network-Based Processing (PDP), 2012 20th Euromicro International Conference on, Feb. 15-17, 2012.*
John Sartori and Rakesh Kumar. "Branch and Data Herding: Reducing Control and Memory Divergence for Error-tolerant GPU Applications" IEEE Transactions on Multimedia (Impact Factor: 2.3). Feb. 2013; 15(2):279-290.*

(Continued)

*Primary Examiner* — Jacob A Petranek
(74) *Attorney, Agent, or Firm* — Zilka-Kotab, PC

(57) ABSTRACT

A system, method, and computer program product for ensuring forward progress of threads that implement divergent operations in a single-instruction, multiple data (SIMD) architecture is disclosed. The method includes the steps of allocating a queue data structure to a thread block including a plurality of threads, determining that a current instruction specifies a yield operation, pushing a token onto the second side of the queue data structure, disabling any active threads in the thread block, popping a next pending token from the first side of the queue data structure, and activating one or more threads in the thread block according to a mask included in the next pending token.

16 Claims, 10 Drawing Sheets

(56) References Cited

OTHER PUBLICATIONS

Maurice Herlihy, Victor Luchangco, Mark Moir. "Obstruction-Free Synchronization: Double-Ended Queues as an Example" In Proc. 23rd International Conference on Distributed Computing Systems, 2003.*

Levinthal, L. et al., "Chap—A SIMD Graphics Processor," Computer Graphics, ACM, vol. 18, No. 3, Jul. 1984, pp. 77-82.

* cited by examiner

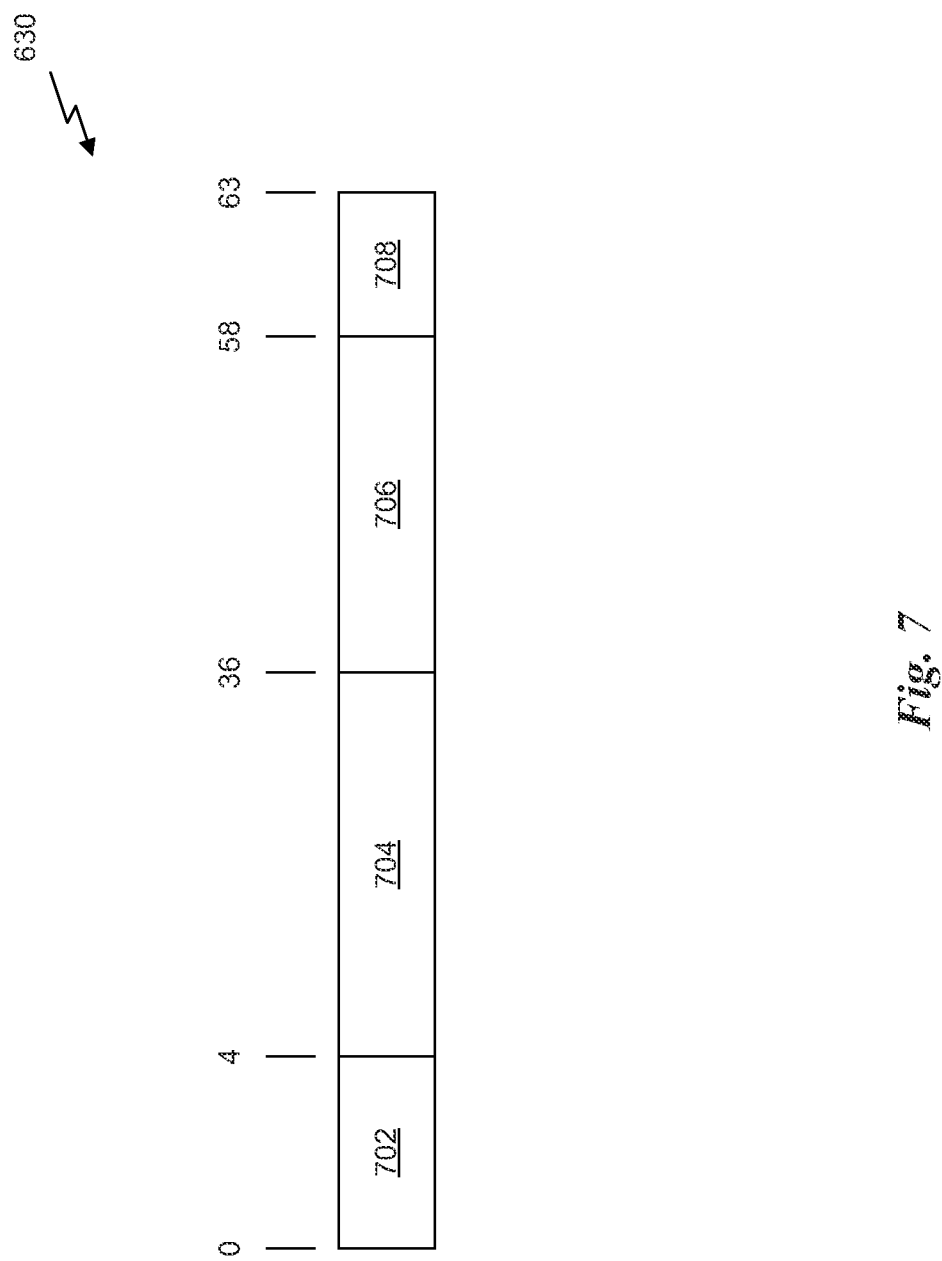

US 9,459,876 B2

SYSTEM, METHOD, AND COMPUTER PROGRAM PRODUCT FOR MANAGING DIVERGENCES AND SYNCHRONIZATION POINTS DURING THREAD BLOCK EXECUTION BY USING A DOUBLE SIDED QUEUE FOR TOKEN STORAGE

FIELD OF THE INVENTION

The present invention relates to data processing, and more particularly to vector threads.

BACKGROUND

Threads (i.e., an abstract construct of an instance of a program executing on a processor) have a basic guarantee of forward progress. In other words, if one thread becomes blocked (e.g., due to resources being unavailable or the inability to acquire a semaphore), then other threads continue to make forward progress until the thread becomes unblocked. The other threads will continue execution unless the other threads are also dependent on unavailable resources. The guarantee of forward progress is necessary to support patterns extremely common in procedural parallel programming, such as locks. In single processors such as conventional CPUs, threads are typically guaranteed forward progress by allocating each thread a number of cycles of the processing unit of the processor in a serialized or round-robin fashion.

Unfortunately, threads executing in a parallel processing architecture, such as architectures common to today's graphics processing units (GPUs), may be executed concurrently and are not typically independent of other concurrently executing threads. When a particular thread becomes blocked, a number of other concurrently executing threads may also become blocked as a result of current divergence mechanisms implemented in parallel processing architectures. Consequently, parallel threads that implement locks or critical sections of code may deadlock unpredictably, thereby failing to ensure forward progress of the threads. Thus, there is a need for addressing this issue and/or other issues associated with the prior art.

SUMMARY

A system, method, and computer program product for ensuring forward progress of threads that implement divergent operations in a single-instruction, multiple data (SIMD) architecture is disclosed. The method includes the steps of allocating a queue data structure to a thread block including a plurality of threads, determining that a current instruction specifies a yield operation, pushing a token onto the second side of the queue data structure, disabling any active threads in the thread block, popping a next pending token from the first side of the queue data structure, and activating one or more threads in the thread block according to a mask included in the next pending token.

BRIEF DESCRIPTION OF THE DRAWINGS

FIG. 7 illustrates a token, in accordance with one embodiment;

DETAILED DESCRIPTION

Divergent threads may be tracked and managed via hardware and software using a data structure stored in a memory. Tokens are inserted into the data structure to track the divergent threads and extracted from the data structure to execute the divergent paths. Tokens are small packets of data that store state information related to a divergence control operation. A YIELD instruction is added to a processor's instruction set that causes the processor to disable the active threads being executed by the processor, insert a token into the data structure, and extract a token from the data structure. The extracted token causes the processor to activate a different set of threads to execute, thus guaranteeing forward progress for different sets of threads in the thread block. In other words, the YIELD instruction enables a program to yield execution time to one or more disabled threads.

Figure 1:
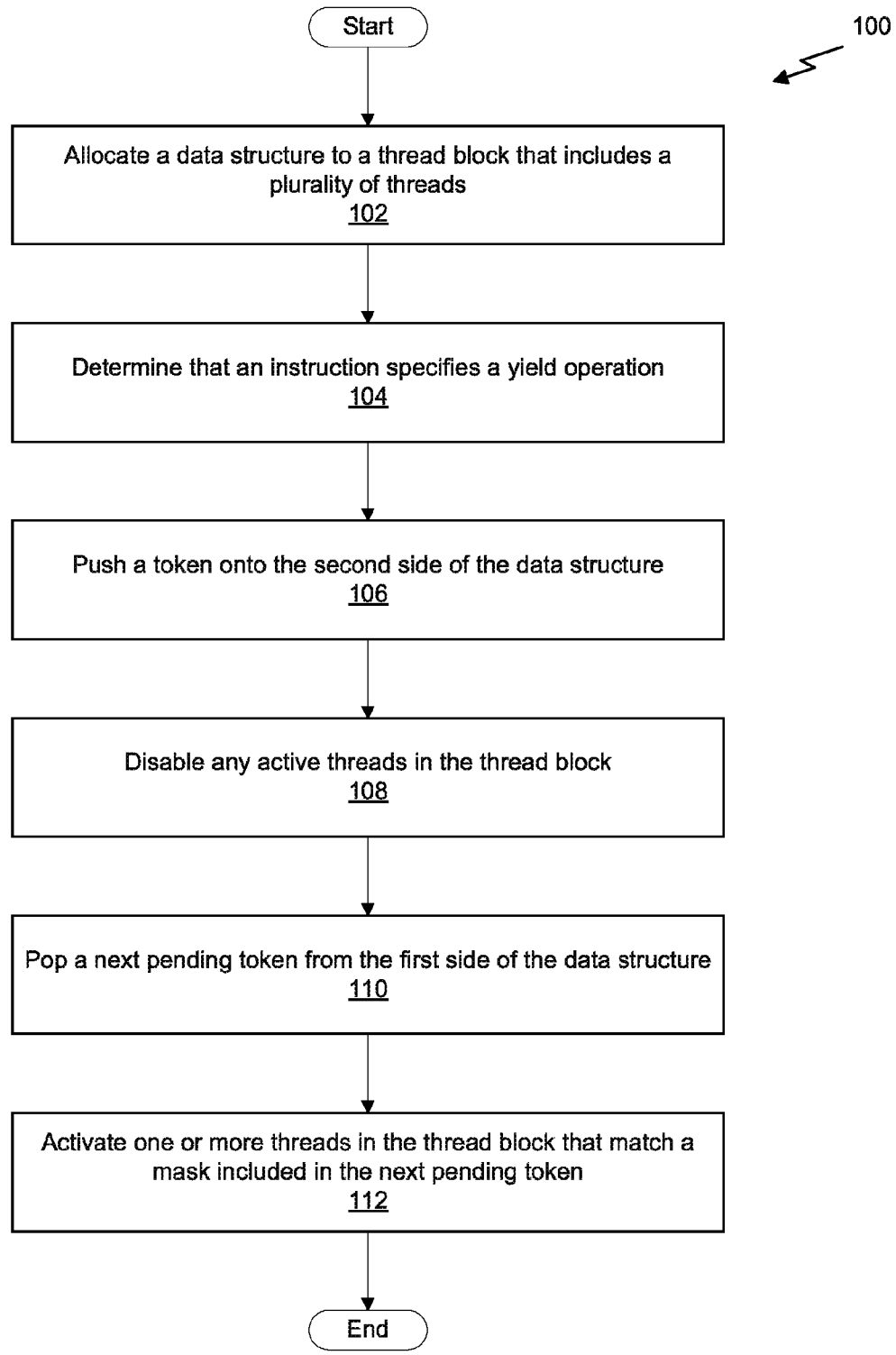
FIG. 1 illustrates a flowchart of a method for managing divergences and synchronization points for a thread block, in accordance with one embodiment.

FIG. 1 illustrates a flowchart of a method 100 for managing divergences and synchronization points for a thread block, in accordance with one embodiment. In one embodiment, a set of tokens included in a data structure are utilized by a processor to manage the divergences and synchronization points, where the data structure includes a first side where tokens are added to and extracted from the data structure and a second side where tokens are added to the data structure. At step 102, a data structure is allocated to a thread block to be executed by a processor. The thread block includes a plurality of threads configured to execute a program on a plurality of data in a SIMD (single-instruction, multiple data) architecture. The data structure is a double-ended queue having a first side and a second side. The processor is configured to push tokens onto the data structure from both the first side and the second side, and the processor is configured to pop tokens from the data structure from the first side. At step 104, the processor determines that an instruction specifies a yield operation. The instruction is read from a memory location pointed to by an address stored in a program counter associated with the thread block. At step 106, the processor pushes a token onto the second side of the queue data structure. The token may be a yield token that includes a mask that is set equal to an active mask and an address for an instruction in the program that immediately follows the yield instruction. The active mask indicates which threads in the thread block are active.

At step 108, the processor disables any active threads in the thread block. In one embodiment, the processor clears all bits in the active mask associated with the thread block. At step 110, the processor pops a next pending token from the first side of the data structure. In one embodiment, the processor pops one or more tokens from the data structure in addition to the next pending token. At step 112, the processor activates one or more threads in the thread block according to a mask included in the next pending token.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
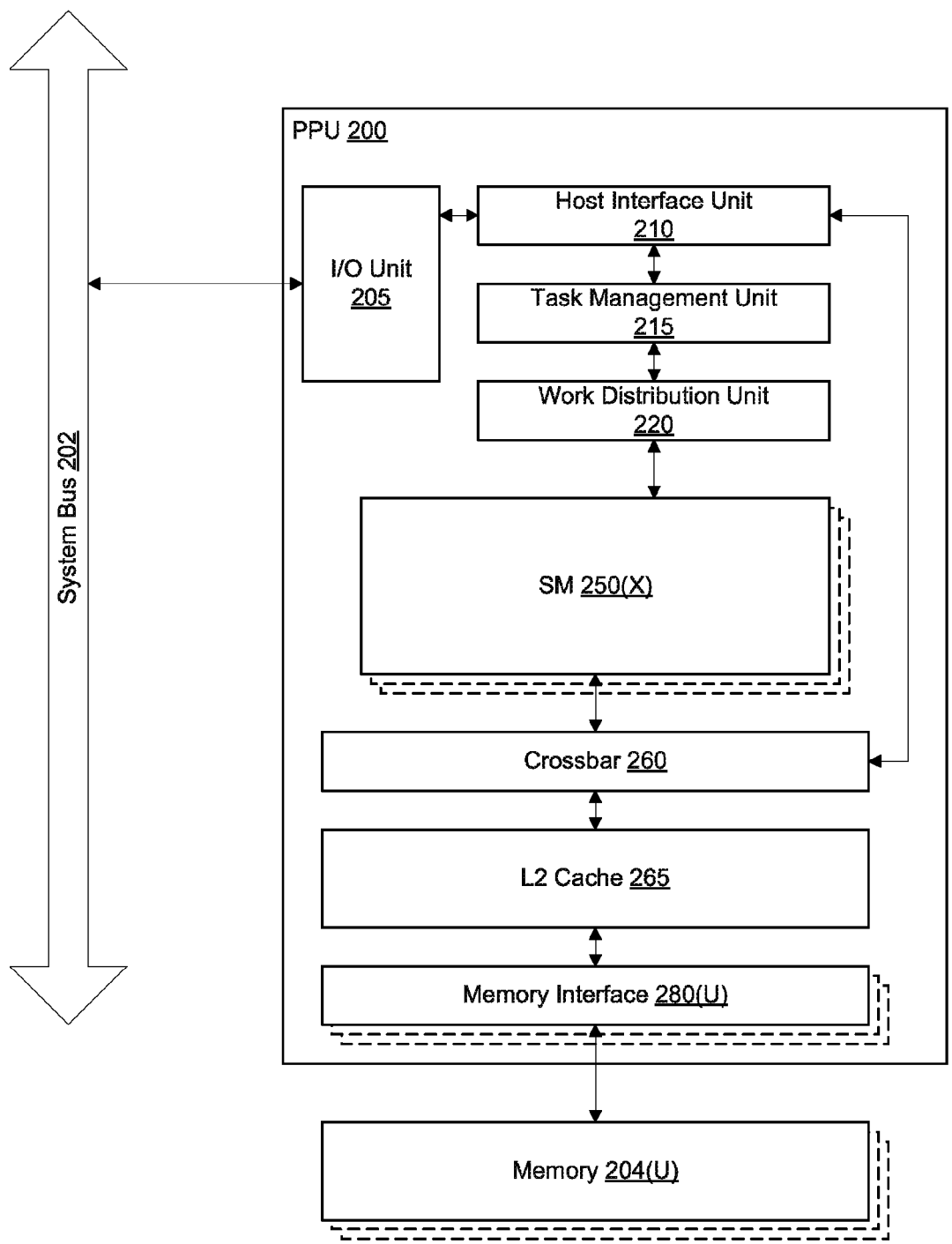
FIG. 2 illustrates a parallel processing unit (PPU), according to one embodiment.

FIG. 2 illustrates a parallel processing unit (PPU) 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 is configured to execute a plurality of threads concurrently in two or more streaming multi-processors (SMs) 250. A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the task management unit 215 or other units of the PPU 200 (e.g., memory interface 280) as the commands may specify. The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the task management unit (TMU) 215 with pointers to one or more streams. The TMU 215 selects one or more streams and is configured to organize the selected streams as a pool of pending grids. The pool of pending grids may include new grids that have not yet been selected for execution and grids that have been partially executed and have been suspended.

A work distribution unit 220 that is coupled between the TMU 215 and the SMs 250 manages a pool of active grids, selecting and dispatching active grids for execution by the SMs 250. Pending grids are transferred to the active grid pool by the TMU 215 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the TMU 215 also receives grids that are dynamically generated by the SMs 250 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more grids for execution. In one embodiment, the PPU 200 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 200 comprises X SMs 250(X). For example, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 comprises U memory interfaces 280(U), where each memory interface 280(U) is connected to a corresponding memory device 204(U). For example, PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the TMU 215 may configure one or more SMs 250 to execute a vertex shader program that processes a number of vertices defined by the model data. In one embodiment, the TMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
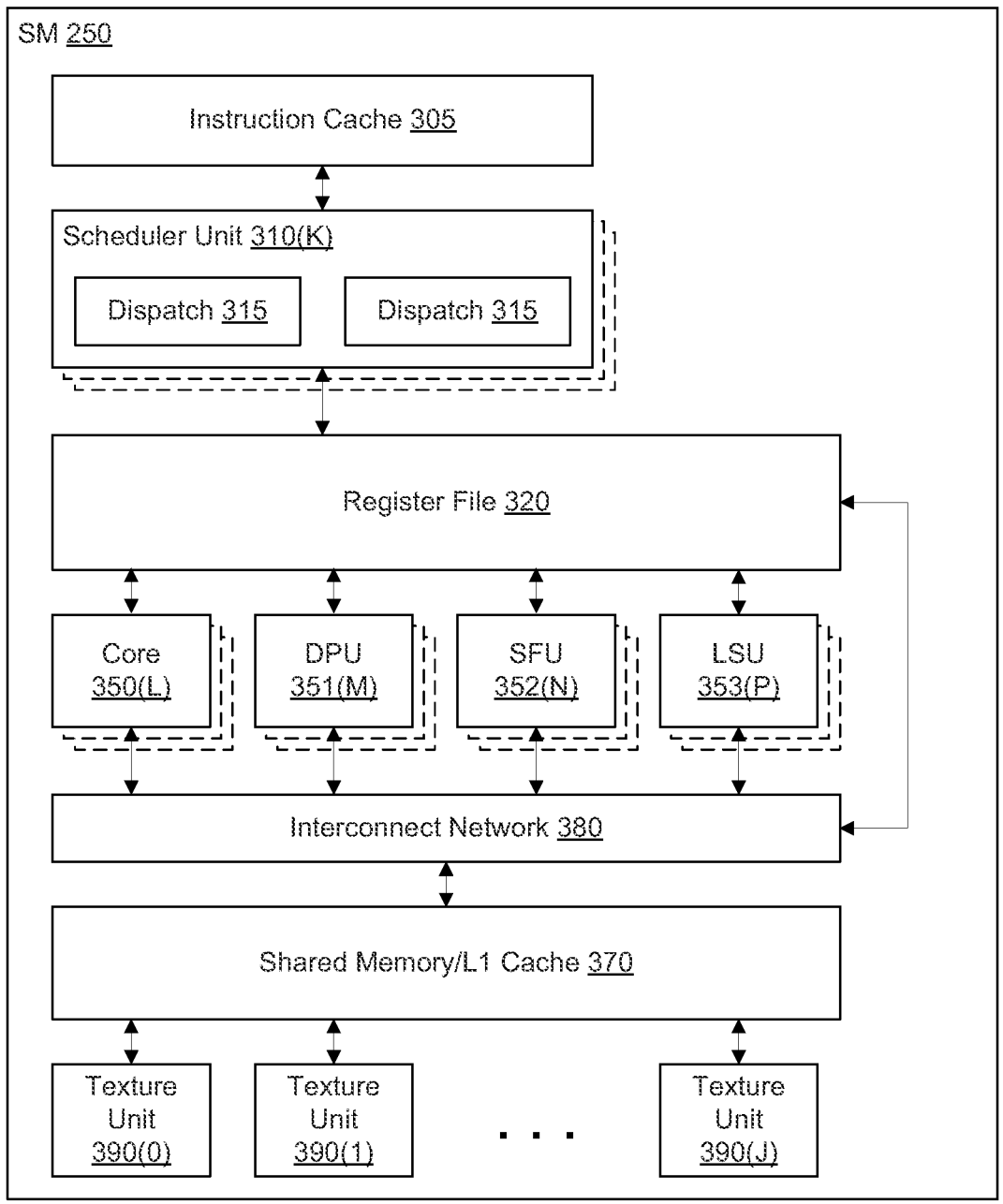
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory/L1 cache 370, and one or more texture units 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 250 includes a register file 320 that provides a set of registers for the functional units of the SM 250. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory/L1 cache 370 and the register file 320. In one embodiment, the SM 250 includes 64 DPUs 351, 32 SFUs 352, and 32 LSUs 353.

Each SM 250 includes an interconnect network 380 that connects each of the functional units to the register file 320 and the shared memory/L1 cache 370. In one embodiment, the interconnect network 380 is a crossbar that can be configured to connect any of the functional units to any of the registers in the register file 320 or the memory locations in shared memory/L1 cache 370.

In one embodiment, the SM 250 is implemented within a GPU. In such an embodiment, the SM 250 comprises J texture units 390. The texture units 390 are configured to load texture maps (i.e., a 2D array of texels) from the memory 204 and sample the texture maps to produce sampled texture values for use in shader programs. The texture units 390 implement texture operations such as anti-aliasing operations using mip-maps (i.e., texture maps of varying levels of detail). In one embodiment, the SM 250 includes 16 texture units 390.

The PPU 200 described above may be configured to perform highly parallel computations much faster than conventional CPUs. Parallel computing has advantages in graphics processing, data compression, biometrics, stream processing algorithms, and the like.

Synchronization of SIMD Threads

Figure 4:
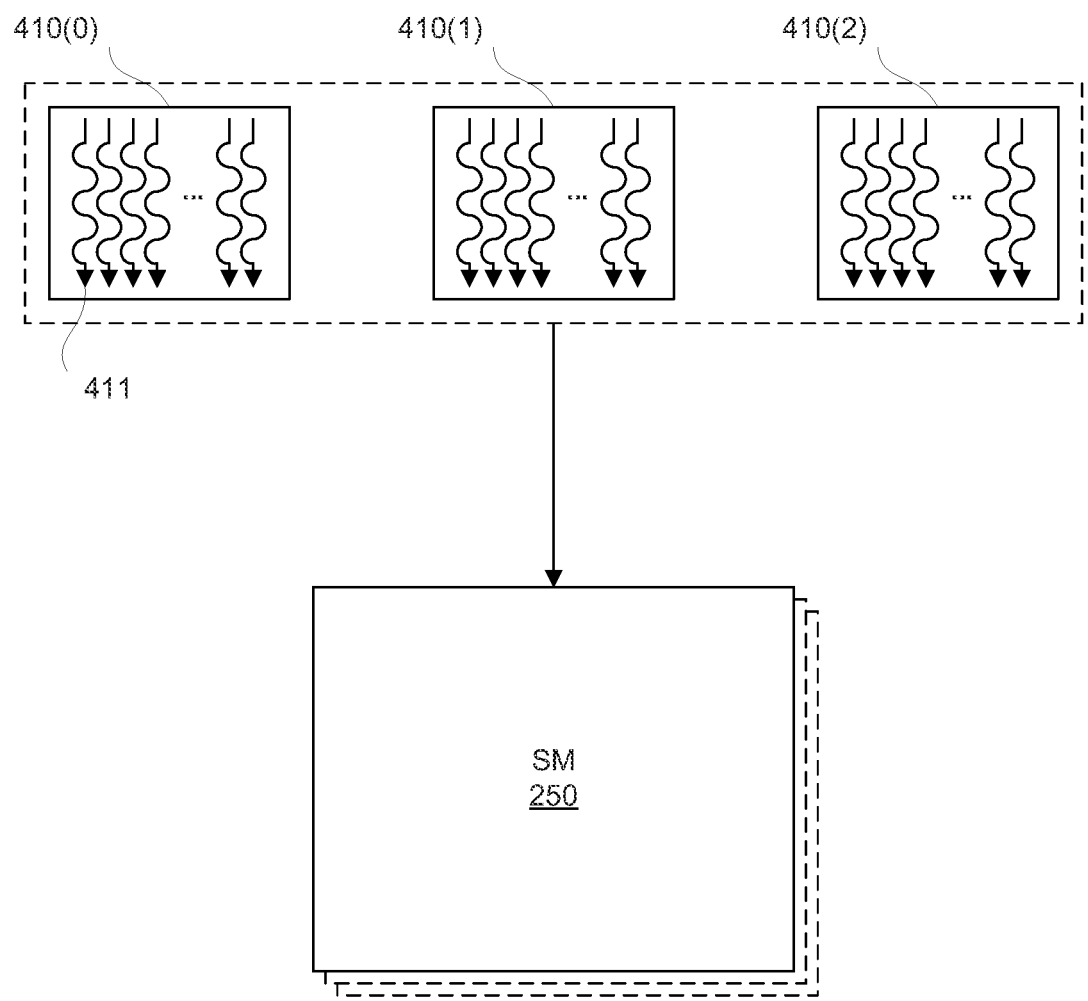
FIG. 4 illustrates a plurality of threads executed by a processor such as the PPU of FIG. 2, in accordance with one embodiment.

FIG. 4 illustrates a plurality of threads executed by a processor such as the PPU 200 of FIG. 2, in accordance with one embodiment. As shown in FIG. 4, a plurality of threads 411 may be instantiated to be executed by one or more processing units in a multi-threaded SIMD (single instruction, multiple data) architecture processor. The plurality of threads 411 may be separated into one or more thread blocks 410 that each contains a number N of threads that are instances of the same program being executed on different sets of data. In one embodiment, the size of the thread blocks 410 is 32 threads wide. A thread block 410 may be executed by an SM 250 on, e.g., 32 functional units such as cores 350, with each functional unit executing one instruction on different data associated with each of the 32 different threads 411 in the thread block 410. In another embodiment, a first portion of the thread block 410 is executed on a number of functional units during a first clock cycle and then a second portion of the thread block 410 is executed on the number of functional units during a second clock cycle. For example, 16 threads 411 may be executed on 16 functional units during a first clock cycle and then the remaining 16 threads 411 of a thread block 410 having 32 total threads 411 are executed on the 16 functional units during a second clock cycle. In other embodiments, multiple thread blocks 410 may be executed on an SM 250 substantially simultaneously. For example, an SM 250 may include 64 or 96 parallel cores 350. In such cases, two or more thread blocks 410 may be executed concurrently on different sets of 32 cores 350.

In one embodiment, a thread block 410 is generated by the SM 250 based on a pointer to a task metadata (TMD) data structure generated in a memory and passed to the PPU 200. The TMD data structure may specify information related to the one or more thread blocks 410 to be executed by the PPU 200. The TMD data structure may also include a pointer to a base memory address for a program (or kernel) to be executed by each of the threads 411 of the one or more thread blocks 410. When the SM 250 launches the task associated with the TMD data structure, the SM 250 generates the one or more thread blocks 410 for execution. Each thread block 410 is executed concurrently on a number of functional units of the SM 250.

In one embodiment, the PPU 200 may be configured to resemble a SIMD architecture processing unit. In the SIMD architecture, the PPU 200 is configured to receive samples (e.g., vertices, fragments, etc.) that are assigned to a particular thread 411 executing on an SM 250. A number of samples are received and assigned to the threads 411 in a thread block 410. Then, the samples are processed in parallel on multiple functional units of the SM 250, with the same instructions being executed by each of the functional units on the different samples.

It will be appreciated that modern processors implement instruction sets that enable branching within programs executed by the processor. In one embodiment, threads 411 in a thread group 410 may diverge based a conditional statement included in an instruction. For example, an instruction in the program executed by the threads 411 may specify a conditional branch instruction. The conditional branch instruction may be related to, for example, an IF statement in a high-level programming language such as C or C++. The conditional branch instruction may evaluate a condition (or inverted condition) for each of the threads 411 in the thread block 410 and then jump to a different location in the program based on the result of the evaluation of the condition. Because each of the threads 411 is associated with different data, some threads 411 in the thread block 410 may evaluate the condition as TRUE while other threads 411 in the thread block 410 may evaluate the condition as FALSE. In other words, some threads 411 may jump to an IF-block of code to be executed when the condition is evaluated as TRUE and other threads 411 may jump to an ELSE-block of code to be executed when the condition is evaluated as FALSE. Because each of the threads 411 in the thread block 410 executes the same instruction across different data, the processor is configured to disable certain threads 411 from executing a particular instruction while other threads 411 in the thread block 410 are executing the instruction.

Because threads diverge, assembly programmers or compilers may utilize special instructions that enable the threads of a program to be synchronized at certain points, ensuring that all threads 411 in the thread block 410 have reached a particular point in the program before executing the next instruction. Modern processors may implement a mechanism for tracking thread divergence and synchronizing a plurality of divergent threads at specific points within the program.

Figure 5:
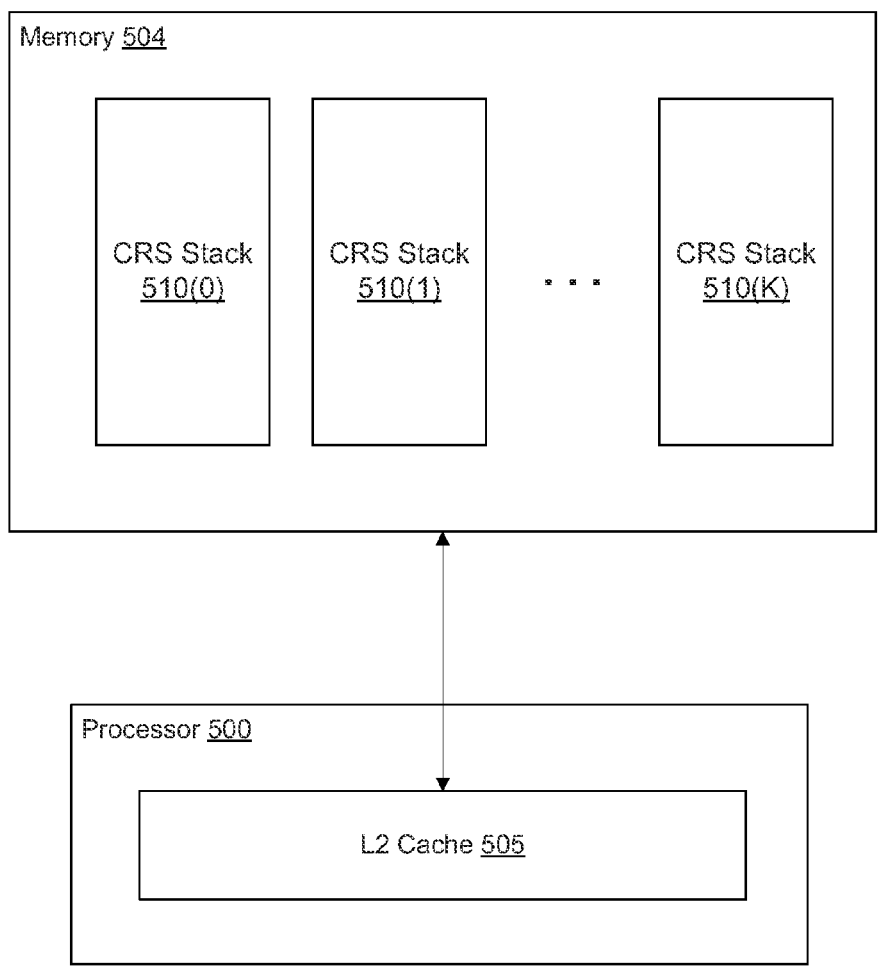
FIG. 5 illustrates a mechanism for synchronizing threads within a thread bock, in accordance with the prior art.

FIG. 5 illustrates a mechanism for synchronizing threads within a thread bock, in accordance with the prior art. As shown in FIG. 5, a software solution has been implemented in order to track thread divergence among a plurality of threads. A processor 500 maintains a Call-Return-Synchronize (CRS) stack data structure 510 in a memory 504 for each thread block being executed by the processor 500. As a thread block is generated, a corresponding CRS stack data structure 510 is allocated in the memory 504. The CRS stack data structure 510 is a last-in, first-out (LIFO) data structure that enables divergence and flow control information to be stored and accessed by the processor. As the thread block is being executed, the processor 500 may store at least a portion of the CRS stack data structure 510 in a local cache such as the L2 cache 505.

As the threads of the thread block diverge, tokens are pushed onto the CRS stack data structure 510 that tracks the divergence of threads. These tokens may then be popped from the CRS stack data structure 510 at a later point in the program to activate certain threads and jump to a specific location in the program based on the information contained in the tokens. This mechanism enables multiple nested divergences to be tracked in a reliable manner. The actual number of divergences and nested levels is limited by the size of the CRS stack data structure 510. The inclusion of instructions specifying divergence control operations that control the creation and unwinding of the tokens may be managed by a compiler implemented in a device driver for the processor 500. The driver may also be configured to manage the CRS stack data structure 510. In other words, the driver may insert commands before or after certain instructions in the program that cause tokens to be pushed onto or popped from the CRS stack data structure 510 and processed by the processor 500.

The processor 500 is configured to maintain an active mask and a program counter for each thread block being executed by the processor 500. The active mask is a string of bits that indicates which threads in the thread group are currently active (i.e., which threads in the thread block execute the instruction specified by the address pointed to by the program counter). Each bit in the active mask corresponds to a particular thread in the thread block. A bit in the active mask may be set to indicate that a corresponding thread is active. Consequently, when all bits of the active mask are set, the thread block is fully synchronized. The program counter indicates the address of the instruction currently being executed by the active threads in the thread block.

As the driver compiles the program, the compiler may encounter one or more instructions that specify branch operations. When a branch operation is encountered, the compiler inserts instructions in the program that cause tokens to be pushed or popped from the CRS stack data structure 510. Each token includes state information related to various threads in the thread block. The specific state information included in a token may depend on the type of branch operation encountered in the program.

For example, if the compiler encounters an IF statement, the compiler may include a set synchronization instruction before a conditional branch operation. The set synchronization instruction causes the processor 500 to push a synchronization token onto the CRS stack data structure 510. The synchronization token includes a mask that indicates which threads were active prior to the conditional branch operation and an address for an instruction located at a convergence point after the conditional branch instruction. The synchronization token may also include a field that indicates the type of token, such as 4-bits that indicate that the token is a synchronization token.

As the conditional branch operation is executed, the processor 500 may be configured to push a divergence token onto the CRS stack data structure 500. A divergence token includes a mask that indicates which threads in the active mask were disabled based on the evaluation of the conditional branch operation and an address to a location in the program associated with the path to be executed by the disabled threads. The processor 500 disables a portion of the active threads based on the evaluation of the condition and executes the instructions on one of the paths of the branch for the remaining active threads. For example, if the conditional branch operation is associated with an IF . . . ELSE statement, then a first portion of the threads may evaluate the condition as true and execute the IF-block of code and a second portion of the threads may evaluate the condition as false and execute the ELSE-block of code. If the processor 500 disables all active threads that evaluate the condition as FALSE, then the IF-block of code is selected as the taken-path and the ELSE-block of code is selected as the not-taken-path. Conversely, if the processor 500 disables all active threads that evaluate the condition as TRUE, then the ELSE-block of code is selected as the taken-path and the IF-block of code is selected as the not-taken-path. The processor 500 executes the taken-path associated with the conditional branch operation for the remaining active threads.

At the end of the taken-path, the compiler may include an EXIT instruction or a BREAK instruction that causes the processor 500 to disable all of the active threads based on the completion of the taken-path block of code. When all active threads have been disabled, the processor 500 is configured to pop one or more tokens from the top of the CRS stack data structure 510. In this case the top token would be a divergence token. The processor activates the threads in the mask of the divergence token, which includes all threads associated with the not-taken-path of the conditional branch operation, and updates the program counter with the address included in the divergence token, which is the first instruction in the not-taken-path block of code.

The compiler may also include an instruction for a synchronization operation in the program before the convergence point after the conditional branch operation. The synchronization operation causes the processor 500 to disable all active threads in order to synchronize the active threads with one or more inactive threads in the thread block. When all of the active threads have been disabled, the processor 500 pops one or more tokens from the CRS stack data structure 510. In this case, the token is a synchronization token. The processor 500 activates all threads indicated by the mask in the synchronization token and updates the program counter with the address included in the synchronization token.

The example described above is merely one example of the types of operations that may be effectuated using the CRS stack data structure 510. For example, synchronization may be implemented around loops such as a WHILE statement, a DO statement, or a FOR statement in a high-level programming language. Synchronization may also be implemented around function calls, where different threads may return from the function at different points (e.g., due to a break statement or loops within the function). It will be appreciated that compilers may not implement synchronization points based on high-level programming instructions such as a WHILE statement for generating a loop structure. Instead, compilers typically construct an abstracted control-flow graph and perform an analysis on the control-flow graph that reveals potentially multiple nested structures in the program where a divergence may occur. Notably, a program using IF-statements and GOTO statements may be synchronized just as well as a program using a WHILE statement.

A synchronization operation may be inserted into the program using a set synchronization instruction (SSY) and a corresponding synchronization instruction (SYNC). The set synchronization instruction causes the processor 500 to push a synchronization token onto the CRS stack data structure 510. The synchronization instruction causes the processor 500 to disable all active threads and pop a token from the CRS stack data structure 510. The set synchronization instruction is inserted before a branch in the program where threads could diverge and the corresponding synchronization instruction is inserted at a later point in the program where the divergent threads are converged (e.g., after the end of an IF statement or a loop).

It will be appreciated that a single, unique semantic may be used for various instructions that cause the processor 500 to disable the active threads and pop tokens from the CRS stack data structure 510. The semantic is parameterized on a "reason" for why the processor 500 disables the active threads. All reasons for disabling the active threads may be considered equal, can be reduced to a value (e.g., 0 through 15 stored in 4 bits), and have been associated with human-friendly handles (i.e., SSY, BRK, CONT, LONGJMP, RET, etc.) to aid in programming comprehension by a programmer. Compilers are generally configured to analyze the control-flow graph for a program and select the correct reason for disabling the active threads in order to help the programmer during debugging. As used herein, the semantic may be described throughout using the various human-friendly handles for illustrative purposes.

Specific reasons for disabling a thread may include a break operation (associated with a PBRK (pre-break) instruction and a corresponding BRK (break) instruction), a continuation operation (associated with a PCONT (pre-continuation) instruction and a corresponding CONT (continuation) instruction), a branch operation (associated with a BRA (branch) instruction or an indirect BRX (indirect branch) instruction), a jump operation (associated with a JMP (jump) instruction or an indirect JMX (indirect jump) instruction), and an exit operation (associated with a PEXIT (pre-exit) instruction and a corresponding EXIT (exit) instruction).

Although the preceding operations are disclosed herein, other systems may implement further operations to track and manage thread divergence in SIMD processors. Such other operations are contemplated as being within the scope of the present disclosure and may be included in the instruction set of the processor 500.

It will be appreciated that some common issues may arise in vector programs due to the divergence of various threads that may cause the processor 500 to deadlock when certain programming techniques are employed. For example, mutual exclusion (mutex) mechanisms for critical sections of code may be used to ensure that two threads do not attempt to use the same resource (e.g., shared memory) at the same time. Mutual exclusion on a multi-processor system may utilize an atomic test-and-set instruction to test and set a value in a shared memory location. The atomic nature of the instruction ensures that only one thread can set the value at a time. Therefore, if every thread in a thread block attempts to set a value at a memory location to a value associated with that particular thread, the shared memory location will be updated by only one thread, which indicates that that thread is allowed to use the shared resource at the exclusion of other threads in the thread block. Other mutual exclusion mechanisms such as compare-and-swap may also be implemented by a programmer and the instruction set of the processor 500.

An issue can arise when a thread obtains a mutex and is then deactivated due to the divergence of the threads based on a conditional branch operation. For example, a particular thread may obtain a mutex prior to branching based on an IF statement. If the thread that acquired the mutex is then deactivated, due to the thread evaluating the conditional statement that leads to the thread executing the not-taken-path, for example, then the other threads that are activated as part of the taken-path may deadlock while waiting for the mutex to be released by a deactivated thread. Because the threads in the taken-path are stalled, the not-taken-path is never executed and the program deadlocks. The issue is that not all threads are guaranteed forward progress because the CRS stack data structure 510 implementation serializes the execution of divergent threads in the SIMD architecture. Therefore, a solution to this issue may guarantee that all threads in the thread block, regardless of the particular path selected, are guaranteed forward progress.

Figure 6A:
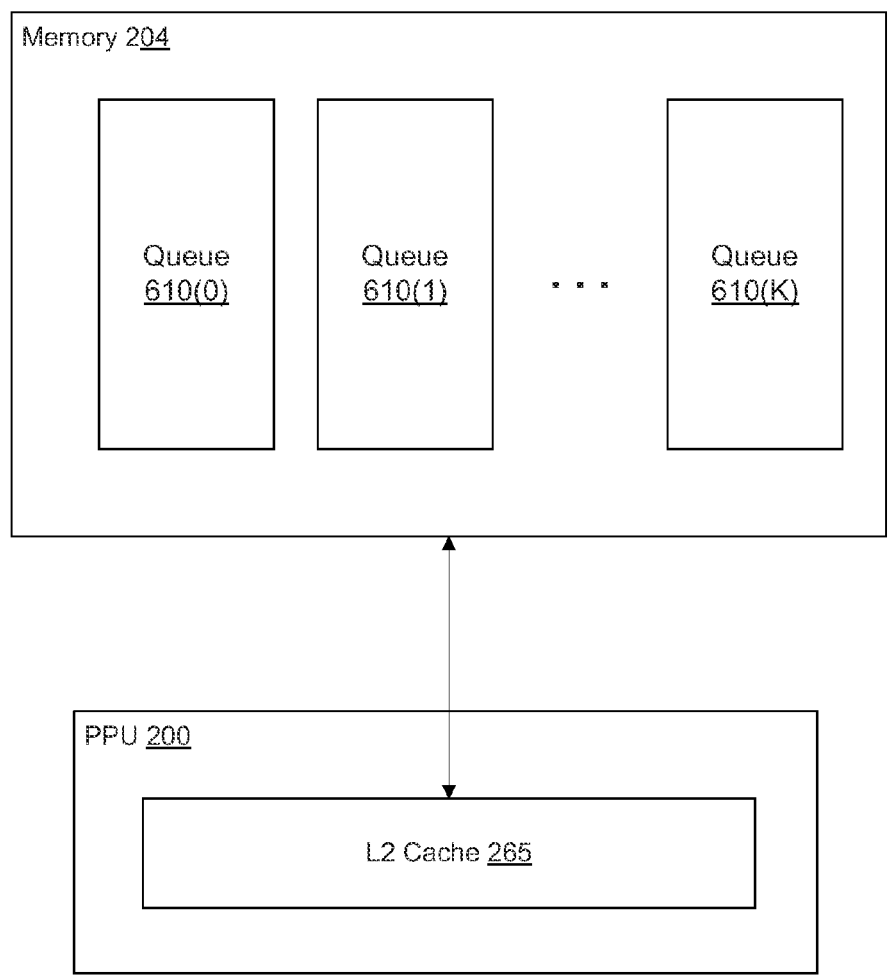
FIGS. 6A and 6B illustrate a mechanism for synchronizing threads in a thread block that guarantees forward progress of each thread in the thread block, in accordance with one embodiment.
Figure 6B:
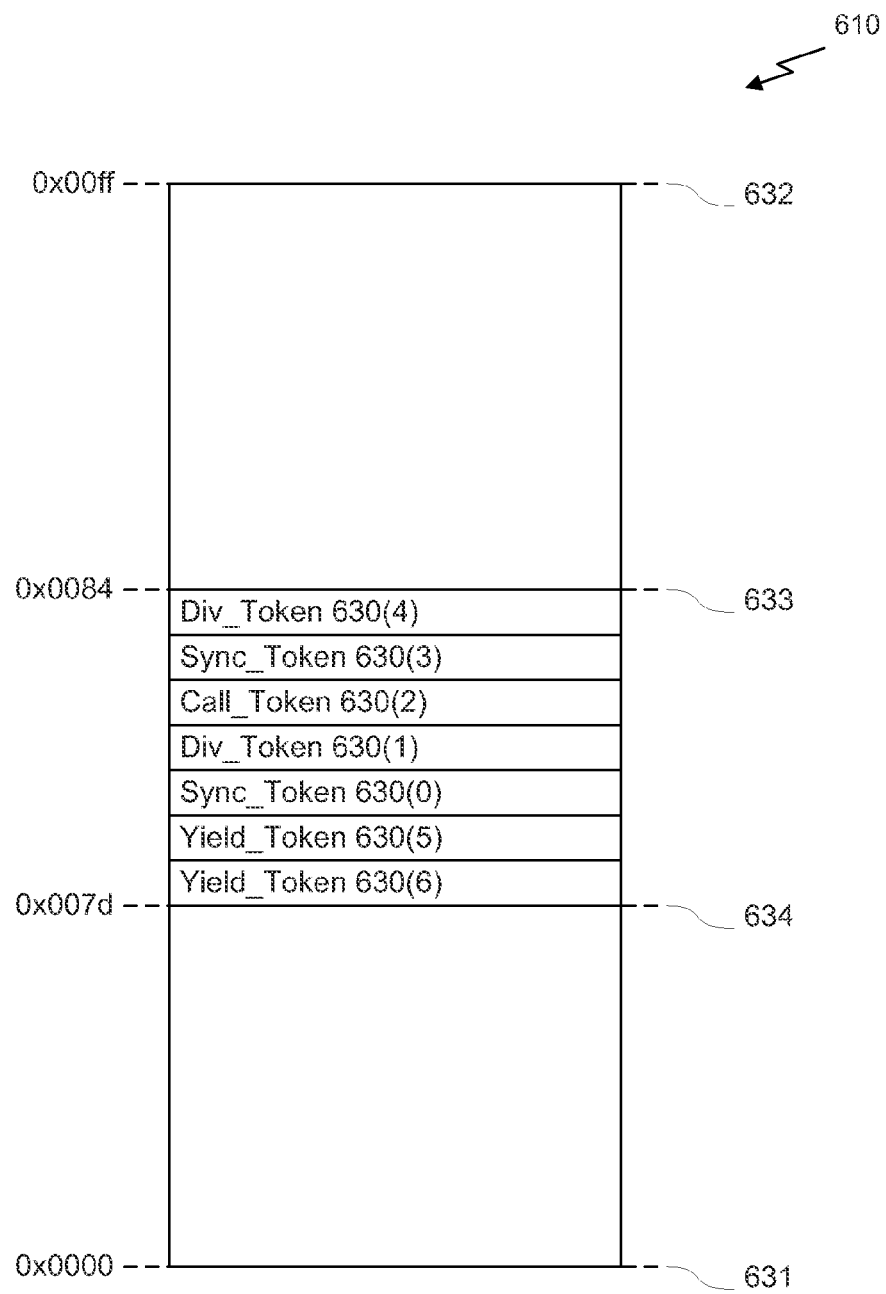

FIGS. 6A and 6B illustrate a mechanism for synchronizing threads in a thread block that guarantees forward progress of each thread 411 in the thread block 410, in accordance with one embodiment. As shown in FIG. 6A, the CRS stack data structure 510 may be replaced with a double-ended queue data structure 610. The queue data structure 610 is similar to the CRS stack data structure 510 in that tokens may be pushed onto the front of the queue data structure 610 and popped from the front of the queue data structure 610 in a LIFO format. However, unlike the CRS stack data structure 510, tokens may also be inserted at the back of the queue data structure 610 in a FIFO format. In other words, tokens may be inserted from either the front or the back of the queue data structure 610 but tokens are only popped from the front of the queue data structure 610. As used herein, the front and back of the queue data structure 610 may refer to a first side and a second side of the queue data structure 610, respectively. In addition, front and back may be used interchangeably with top and bottom, respectively, and both sets of interchangeable terms refer to the first side and the second side of the queue data structure 610.

In one embodiment, the queue data structure 610 is stored in the memory 204 associated with the PPU 200. Each thread block 410 being executed by the PPU 200 is associated with a corresponding queue data structure 610. In addition, unless otherwise noted below, the functionality of the prior art processor 500 may be incorporated in whole or in part into the instruction set of the PPU 200 where the instructions are configured to push tokens onto the queue data structure 610 instead of the CRS stack data structure 510.

In one embodiment, as shown in FIG. 6B, the queue data structure 610 is an allocated portion of the memory 204. The device driver for the PPU 200 may allocate one queue data structure 610 for each thread block 410 being executed by the PPU 200. The queue data structure 610 is located at a base address 631 in the memory 204. The queue data structure 610 has a limited size defined as the difference between a maximum address 632 and the base address 631. The queue data structure 610 stores zero or more tokens 630 in entries of the queue data structure 610. In one embodiment, each token 630 (or entry) is 64 bits wide, including a 32-bit mask, a 4-bit identifier, and a 22-bit address. In other embodiments, the additional six bits may be utilized for a longer address or a longer identifier field. The additional 6 bits may also be used to store additional state information for the thread block, such as indicating which reasons threads in the thread block have been deactivated (the reasons corresponding to the types of tokens pushed into the queue data structure 610 such as synchronization, divergence, break, etc.). In alternative embodiments, tokens 630 can be sized to store state information necessary to implement additional functionality associated with executing divergent threads. For example, tokens may be 128 bits wide to store a 32-bit address, a 64-bit mask, and an 8-bit identifier, along with any additional state information as required.

Tokens 630 may be added to entries pointed to by the head pointer 633 of the queue data structure 610. For example, when a queue data structure 610 is allocated by the device driver for the PPU 200, the head pointer 633 may be set to a mid-point of the allocated space (e.g., an offset 0x0080 from the base address, in the case of a 256 entry queue data structure 610). As tokens 630 are pushed onto the queue data structure 610, the head pointer 633 is incremented to point to the next entry in the queue data structure 610. As shown in FIG. 6B, a synchronization token 630(0), a divergence token 630(1), a call token 630(2), a second synchronization token 630(3), and a second divergence token 630(4) have been pushed onto the queue data structure 610. The example arrangement of tokens 630 as shown in FIG. 6B may be generated by a program with an IF statement that includes a function call in the taken-path block of code. The function may also include another nested IF statement. As the program is executed, the PPU 200 may push the tokens 630 onto the queue data structure 610 at a location pointed to by the head pointer 633. As active threads 411 are disabled by the processor based on instructions inserted into the program by the compiler, the tokens 630 may be popped from the front of the queue data structure 610 and unwound.

As discussed above, pushing tokens 630 onto the front of the queue data structure 610 and popping tokens 630 from the front of the queue data structure 610 does not guarantee forward progress among the various threads 411 of a thread block 410. In order to guarantee forward progress among the various groups of threads 411, a special YIELD instruction is created and added to the instruction set of the PPU 200. The YIELD instruction causes the PPU 200 to disable all active threads 411 in a thread block 410. The YIELD instruction also causes the PPU 200 to push a yield token onto the back of the queue data structure 610. The yield token includes a mask that is set equal to the current active mask when the YIELD instruction is executed and an address that corresponds to the instruction that immediately follows the yield instruction. Once all active threads 411 have been disabled by the PPU 200, the PPU 200 pops a token from the front of the queue data structure 610. If the type of token 630 matches a reason for disabling at least one thread 411 in the thread block 410, then the threads 411 indicated by the mask in the token 630 are enabled and the program counter is updated to match the address in the token 630. Otherwise, the token 630 is discarded and the next token 630 is popped from the front of the queue data structure 610. A token 630 is only discarded if none of the threads have been disabled according to a "reason" included in the token 630.

In one embodiment, the YIELD instruction is added to any non-deterministic loop within a program. In other words, programs without loops will eventually end and upon exit, each divergent branch would eventually be executed. Even some programs with loops are deterministic in that the loop is configured to run for a determined number of iterations (e.g., a FOR loop such as for(int i=0; i<8; i++) { . . . }). Thus, the YIELD instruction is inserted into any program by the compiler where a loop exists that has a condition for exiting the loop that depends on a value in a memory location. For example, a WHILE loop such as while(x!=0) { . . . } could utilize a YIELD instruction to ensure that the threads inside the WHILE loop do not continue to spin (i.e., continually iterate through the loop) while the variable x is unchanged because the thread that controls the variable x is disabled. Typically, the mutual exclusion mechanisms discussed above implement loops to attempt to gain control of the shared resource and, therefore, the YIELD instruction may be implemented within the mutual exclusion mechanisms to prevent deadlock conditions.

In some embodiments, the YIELD instruction causes the PPU 200 to potentially disable the active threads 411. For example, in one embodiment, the YIELD instruction may be configured to disable the active threads 411 within a loop every N iterations of the loop. In other words, the YIELD instruction may be associated with a counter for each set of active threads 411 that counts how many times the YIELD instruction has been executed for the set of active threads 411. The counter is initialized to zero and every time the YIELD instruction is executed for a particular set of active threads 411, the counter is incremented by one. The PPU 200 may then be configured to disable the active threads 411 based on the execution of the YIELD instruction only when the counter is greater than or equal to N. If the PPU 200 disables the active threads 411 based on the YIELD instruction, then the counter is reset to zero. In another embodiment, the YIELD instruction may be configured to disable the active threads 411 within a loop based on a random number generator. The YIELD instruction will disable the threads 411 only if a random number generated by a random number generator is above or below a threshold value. In other words, each time the YIELD instruction is executed by the PPU 200, there is a chance that the threads 411 will be disabled. The probability that the threads 411 will be disabled is determined based on the threshold vale. Even a small chance that the threads 411 will be disabled ensures that all threads 411 are given a guarantee of forward progress as long as the random number generator is truly random.

The yield instruction breaks the serialized nature of storing tokens in the CRS stack data structure 510 according to a LIFO manner of operation. In other words, the yield tokens are pushed onto the back of the queue data structure 610 and operate in a FIFO manner of operation in conjunction with the FIFO manner of operation for other divergence control operations. When a yield instruction is encountered in a program, the active threads 411 are disabled. The PPU 200 looks at the tokens in the queue data structure 610 for a match for the current yield instruction. A match is found when a token in the queue data structure 610 is a yield token and has the same address as the address included in the yield instruction. If the PPU 200 finds a match for the yield instruction, then the PPU 200 merges the current active mask with the mask in the token by performing a logical OR operation with the current active mask and the mask in the token. However, if the PPU 200 does not find a match for the yield instruction, then the PPU 200 pushes a yield token onto the queue data structure 610. Finally, the PPU 200 pops a token from the queue data structure 610 and activates the threads 411 specified by the token and updates the program counter with the address in the token. It will be appreciated that the purpose of the YIELD instruction is to enable threads to effectively opt-out of the various synchronization operations included in the program. Threads that yield to other threads in the program will never take part in any pending synchronization operations because the tokens for those operations will be discarded. Instead, the yield token merging process ensures that if threads yield at the same address, then the threads can be opportunistically converged. Software may utilize the YIELD instruction to create a convergence barrier in the program, which the hardware could not implement as configured.

In order to handle the case where a divergence control operation is encountered in the program that does not have a corresponding token in the queue data structure 610, the instruction set of the PPU 200 is changed such that the SYNC, BRK, and CONT instructions include an immediate address to jump to when a corresponding token is not found in the queue data structure 610. In other words, if a matching token is not found, then threads 411 execute a simple branch to the address specified in the divergence control operation and tokens are popped from the queue data structure 610 until a yield token is at the front of the queue data structure 610. This allows for synchronization points to become optional while the branch is not optional.

It will be appreciated that implementing a double-ended queue data structure 610 allows the queue data structure 610 to fill in both directions. At some point in a program, pushing tokens onto the queue data structure 610 may cause the head pointer 633 or the tail pointer 634 to exceed one of the upper or lower bounds of the allocated space in the memory. In this case, an exception may be thrown that causes the driver or other software processes executed by the PPU 200 to adjust the entries in the queue data structure 610 such that the entries in the queue data structure 610 are approximately centered within the allocated space. In other words, the driver may copy the tokens from one entry of the queue data structure 610 into another entry of the queue data structure 610. The effect should be to approximately center the total number of entries within the allocated space of the queue data structure 610.

It will be appreciated that the YIELD instruction and the queue data structure 610 mechanism described above is not limited to only the PPU 200. Other types of SIMD processors may also implement the YIELD instruction and a queue data structure 610 in a memory associated with the SIMD processor. Such other implementations are contemplated as being within the scope of the present disclosure.

FIG. 7 illustrates a token 630, in accordance with one embodiment. As shown in FIG. 7, the token 630 is 64 bits wide and includes a token identifier 702, a mask 704, an address 706, and a plurality of reserved bits 708. The token identifier 702 is stored in bits [0:3] of the token 630. The token identifier 702 enables the compiler to store tokens of different types in the queue data structure 610 and for the PPU 200 to identify tokens 630 of different types. For example, a synchronize token may include a token identifier of 0b0010 whereas a divergence token may include a token identifier of 0b0011. Furthermore, a yield token may include a different identifier of 0b0100 and so forth. It will be appreciated that four bits may encode sixteen separate and distinct token types. For additional token types, one or more additional bits may be included in the token identifier 702.

The mask 704 is stored in bits [4:35] of the token 630. The address 706 is stored in bits [36:57] of the token 630. The mask 704 in conjunction with the address 706 may be used to enable certain threads 411 in a thread block 410 and update the program counter to execute a particular section of code with a particular set of threads 411.

In one embodiment, at least a portion of the plurality of reserved bits 708 may be used to track the types of tokens in the queue data structure 610 below the new token 630. For example, four bits (e.g., bits [58:61] of the token 630) may be used to track the types of tokens in the queue data structure 610. Each bit of the four bits indicates whether a token 630 of a particular type is currently included in an entry of the queue data structure 610 below the token 630. A first bit (e.g., bit [58]) may indicate whether a synchronization token is included in the queue data structure 610 below the token 630. A second bit (e.g., bit [59]) may indicate whether a divergence token is included in the queue data structure 610 below the token 630. A third bit (e.g., bit [60]) may indicate whether a call token is included in the queue data structure 610 below the token 630. A fourth bit (e.g., bit[61]) may indicate whether a yield token is included in the queue data structure 610 below the token 630, and so forth. When a token 630 is pushed to the front of the queue data structure 610, the bits may be logically ORed with the bits in the adjacent token 630 and then a bit corresponding to the type of token at the top of the queue data structure 610 is set if the bit is not set already. Thus, the PPU 200 may simply inspect the bits of the token 630 at the front of the queue data structure 610 to determine whether the queue data structure 610 includes a token 630 of a particular type below the token 630. Without these bits, the PPU 200 would potentially have to inspect each and every token 630 included in the queue data structure 610 to determine whether a token 630 of a particular type was included in the queue data structure 610 or not.

Figure 8:
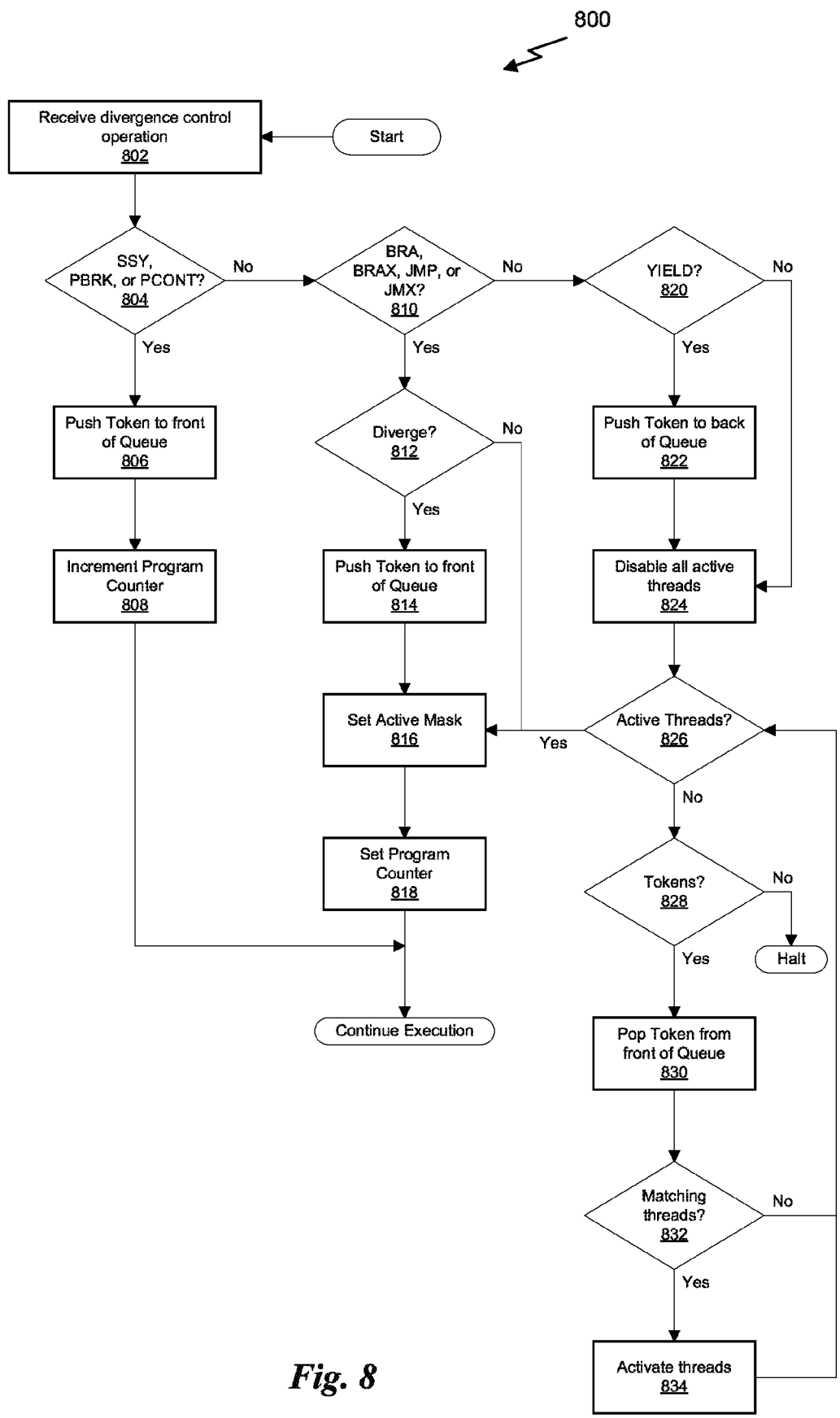
FIG. 8 illustrates a flowchart of a method for ensuring forward progress for threads in a thread block, in accordance with another embodiment.

FIG. 8 illustrates a flowchart of a method 800 for ensuring forward progress for threads in a thread block, in accordance with another embodiment. At step 802, the PPU 200 receives an instruction that specifies a divergence control operation. The divergence control operations may be one of a set synchronization operation, a pre-break operation, a pre-continuation operation, a pre-exit operation, a branch operation, an indirect branch operation, a jump operation, an indirect jump operation, a yield operation, a synchronization operation, a break operation, or a continuation operation. It will be appreciated that, although not listed here, other types of operations may be included in the ISA of the PPU 200. At step 804, the PPU 200 determines whether the divergence control operation is one of a set synchronization operation, a pre-break operation, or a pre-continuation operation. If the divergence control operation is one of a set synchronization operation, a pre-break operation, or a pre-continuation operation, then the method 800 proceeds to step 806 where the PPU 200 pushes a token on the front of the queue data structure 610. At step 808, the PPU 200 increments the program counter associated with the current thread block 410. After step 808, the PPU 200 continues execution of the next instruction specified by the program counter.

Returning to step 804, if the divergence control operation is not one of a set synchronization operation, a pre-break operation, or a pre-continuation operation, then the method 800 proceeds to step 810 where the PPU 200 determines whether the divergence control operation is one of a branch operation, an indirect branch operation, a jump operation, or an indirect jump operation. If the divergence control operation is one of a branch operation, an indirect branch operation, a jump operation, or an indirect jump operation, then the method 800 proceeds to step 812 where the PPU 200 determines whether the threads 411 of the thread block 410 diverge. Each of the branch operation, the indirect branch operation, the jump operation, or the indirect jump operation may be conditioned on the evaluation of a predicate for each of the active threads. Thus, some threads may take the branch while other threads do not. If the threads 411 diverge, then, at step 814, the PPU 200 pushes a token on the front of the queue data structure 610 and the method 800 proceeds to step 816. Returning to step 812, if the threads 411 do not diverge, then the method 800 skips straight to step 816, where the PPU 200 sets the active mask for the thread block 410. If the threads 411 do not diverge, then the active mask remains the same as the active mask prior to executing the divergence control operation. However, if the threads 411 do diverge, then the active mask is changed to reflect the threads 411 that are enabled in one path of the divergent operation. At step 818, the PPU 200 sets the program counter based on an address specified by the divergent control operation. After step 818, the PPU 200 continues execution of the next instruction specified by the program counter.

Returning to step 810, if the divergence control operation is not one of a branch operation, an indirect branch operation, a jump operation, or an indirect jump operation, then the method 800 proceeds to step 820 where the PPU 200 determines whether the divergence control operation is a yield operation. If the divergence control operation is a yield operation, then the method 800 proceeds to step 822 where the PPU 200 pushes a yield token on the back of the queue data structure 610 before the method 800 proceeds to step 824. Returning now to step 820, if the divergence control operation is not a yield operation, then the divergence control operation is a synchronization operation, a break operation, or a continuation operation, and the method 800 proceeds directly to step 824. At step 824, the PPU 200 disables all threads 411 in the thread block 410.

At step 826, the PPU 200 determines whether there are any active threads 411. If there are no active threads 411, then the method 800 proceeds to step 828 where the PPU 200 determines whether there are any tokens 630 in the queue data structure 610. If there are no tokens 630 in the queue data structure 610, then the PPU 200 halts execution as the program is complete. However, if there are tokens 630 in the queue data structure 610, then the method 800 proceeds to step 830 where the PPU 200 pops a token 630 from the front of the queue data structure 610. At step 832, the PPU 200 determines whether the token 630 is associated with any threads 411 in the thread block 410. The token 630 is associated with at least one thread 411 in the thread block 410 when the thread 411 is disabled for a reason that matches the type of token and the thread's corresponding bit is set in the token's mask. If there are no threads 411 in the thread block 410 that are associated with the token 630, then the method 800 returns to step 826. However, if there are threads 411 in the thread block 410 that are associated with the token 630, then the method 800 proceeds to step 834 where the PPU 200 activates at least one thread 411 in the thread block 410. The activated threads may be specified by the mask in the token 630.

Returning to step 826, if there are active threads 411, then the method 800 proceeds to step 816 and step 818 where the active mask and program counter are set based on the mask and address included in the token 630 popped from the front of the queue data structure 610. After step 818 or step 808, the PPU 200 continues executing the next instruction in the program.

Figure 9:
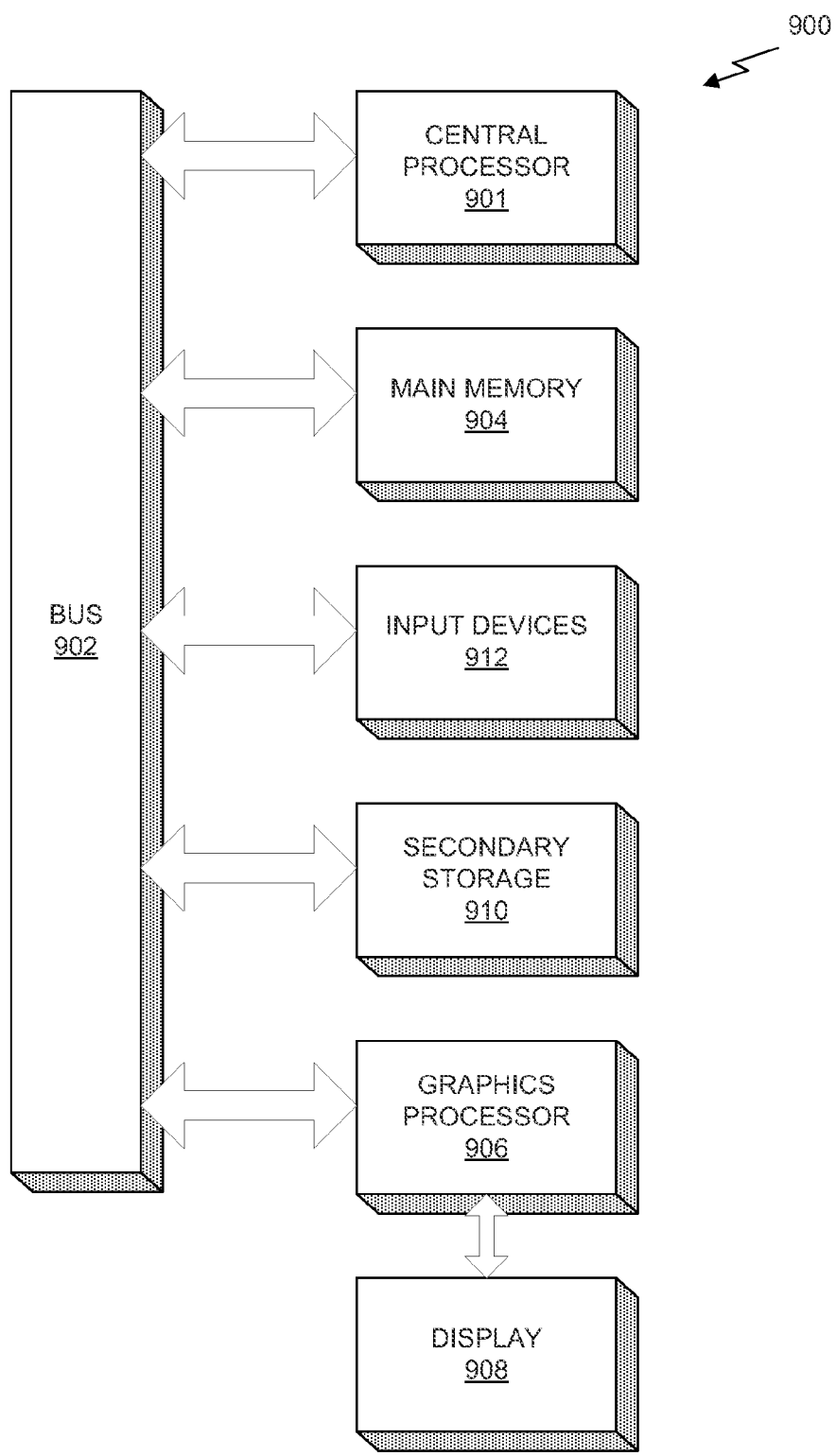
FIG. 9 illustrates an exemplary system in which the various architecture and/or functionality of the various previous embodiments may be implemented.

FIG. 9 illustrates an exemplary system 900 in which the various architecture and/or functionality of the various previous embodiments may be implemented. As shown, a system 900 is provided including at least one central processor 901 that is connected to a communication bus 902. The communication bus 902 may be implemented using any suitable protocol, such as PCI (Peripheral Component Interconnect), PCI-Express, AGP (Accelerated Graphics Port), HyperTransport, or any other bus or point-to-point communication protocol(s). The system 900 also includes a main memory 904. Control logic (software) and data are stored in the main memory 904 which may take the form of random access memory (RAM).

The system 900 also includes input devices 912, a graphics processor 906, and a display 908, i.e. a conventional CRT (cathode ray tube), LCD (liquid crystal display), LED (light emitting diode), plasma display or the like. User input may be received from the input devices 912, e.g., keyboard, mouse, touchpad, microphone, and the like. In one embodiment, the graphics processor 906 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 900 may also include a secondary storage 910. The secondary storage 910 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 904 and/or the secondary storage 910. Such computer programs, when executed, enable the system 900 to perform various functions. The memory 904, the storage 910, and/or any other storage are possible examples of computer-readable media.

In one embodiment, the architecture and/or functionality of the various previous figures may be implemented in the context of the central processor 901, the graphics processor 906, an integrated circuit (not shown) that is capable of at least a portion of the capabilities of both the central processor 901 and the graphics processor 906, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 900 may take the form of a desktop computer, laptop computer, server, workstation, game consoles, embedded system, and/or any other type of logic. Still yet, the system 900 may take the form of various other devices including, but not limited to a personal digital assistant (PDA) device, a mobile phone device, a television, etc.

Further, while not shown, the system 900 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
 managing divergences and synchronization points for a thread block based on a set of tokens included in a data structure having a first side where tokens are added to and extracted from the data structure and a second side where tokens are added to the data structure,
 wherein the thread block includes a plurality of threads executing in parallel.

2. The method of claim 1, wherein managing divergences and synchronization points comprises:
 determining that a current instruction specifies a yield operation;
 disabling any active threads in the thread block; and
 extracting a next pending token from the first side of the data structure.

3. The method of claim 2, further comprising:
 inserting a yield token into the second side of the data structure;
 setting an active mask associated with the thread block to match the mask included in the next pending token; and
 setting a program counter associated with the thread block to equal an address included in the next pending token.

4. The method of claim 1, further comprising utilizing the first side of the data structure to implement a synchronization stack.

5. The method of claim 1, further comprising:
 determining that an instruction specifies an operation from a group of operations consisting of a set synchronization operation, a pre-break operation, and a pre-continuation operation;
 inserting a token onto the first side of the data structure; and
 incrementing a program counter associated with the thread block.

6. The method of claim 1, further comprising:
 determining that an instruction specifies an operation from a group of operations consisting of a branch operation and a jump operation;
 determining that at least one thread in the thread block diverges from at least one other thread in the thread block; and inserting a token onto the first side of the data structure; and incrementing a program counter associated with the thread block.

7. The method of claim 1, further comprising:
determining that an instruction specifies an operation from a group of operations consisting of a synchronization operation, a break operation, and a continuation operation;
disabling all active threads in the thread block;
extracting a token from the first side of the data structure;
activating one or more threads of the thread block;
setting an active mask associated with the thread block to match the mask included in the token; and
setting a program counter associated with the thread block to equal an address included in the token.

8. The method of claim 1, further comprising:
determining that a head pointer associated with the first side of the data structure points to a maximum allocated memory address for the data structure, or
determining that a tail pointer associated with the second side of the data structure points to a base allocated memory address for the data structure; and
copying entries of the data structure to different entries of the data structure to align the entries of the data structure approximately in the center of the allocated memory for the data structure.

9. A non-transitory computer-readable storage medium storing instructions that, when executed by a processor, cause the processor to perform steps comprising:
managing divergences and synchronization points for a thread block based on a set of tokens included in a data structure having a first side where tokens are added to and extracted from the data structure and a second side where tokens are added to the data structure,
wherein the thread block includes a plurality of threads executing in parallel.

10. The non-transitory computer-readable storage medium of claim 9, wherein managing divergences and synchronization points comprises:
determining that a current instruction specifies a yield operation;
disabling any active threads in the thread block; and
extracting a next pending token from the first side of the data structure.

11. The non-transitory computer-readable storage medium of claim 10, the steps further comprising:
inserting a yield token into the second side of the data structure;
setting an active mask associated with the thread block to match the mask included in the next pending token; and
setting a program counter associated with the thread block to equal an address included in the next pending token.

12. A system, comprising:
a memory storing a data structure having a first side where tokens are added to and extracted from the data structure and a second side where tokens are added to the data structure; and
a processor coupled to the memory and configured to:
managing divergences and synchronization points for a thread block based on a set of tokens included in the data structure,
wherein the thread block includes a plurality of threads executing in parallel.

13. The system of claim 12, wherein managing divergences and synchronization points comprises:
determining that a current instruction specifies a yield operation;
disabling any active threads in the thread block; and
extracting a next pending token from the first side of the data structure.

14. The system of claim 12, wherein the processor includes a cache unit, and at least a portion of the data structure is stored in the cache unit during execution of the thread block.

15. The system of claim 12, wherein the processor is a graphics processing unit.

16. The system of claim 15, further comprising a central processing unit coupled to the graphics processing unit, wherein the central processing unit executes a driver that generates a plurality of instructions for the thread block.

* * * * *